United States Patent [19]
Takeuchi et al.

[11] Patent Number: 5,810,111
[45] Date of Patent: Sep. 22, 1998

[54] ELECTRIC POWER STEERING DEVICE

[75] Inventors: Kanji Takeuchi, Gamagori; Takeshi Sawada, Chiryu; Masao Abe, Kariya; Masanori Kondo, Nagoya; Jirou Hayashi, Ama-gun; Yuuji Hashiba, Nagoya, all of Japan

[73] Assignee: Nippondenso Co., Ltd., Kariya, Japan

[21] Appl. No.: 621,667

[22] Filed: Mar. 22, 1996

[30] Foreign Application Priority Data

Mar. 24, 1995 [JP] Japan ................................. 7-066367

[51] Int. Cl.[6] ............................................... B62D 5/04
[52] U.S. Cl. ...................... 180/443; 318/471; 180/446
[58] Field of Search ................................. 180/443, 444, 180/445, 446; 364/424.051, 424.052, 424.053, 424.054; 74/388 PS; 318/434, 430, 471, 472, 473, 293; 361/690, 711, 717; 701/41, 43

[56] References Cited

U.S. PATENT DOCUMENTS 4,834,202  5/1989  Shimizu ................................. 180/443
4,918,744  4/1990  Shimizu ................................. 180/446
5,573,079  11/1996  Suda et al. ........................... 180/446

FOREIGN PATENT DOCUMENTS 0 535 422 A1  4/1993  European Pat. Off. .
60-234069  11/1985  Japan .
1-154073  10/1989  Japan .
3007661  1/1991  Japan .

*Primary Examiner*—Douglas C. Butler
*Attorney, Agent, or Firm*—Cushman Darby & Cushman IP Group of Pillsbury Madison & Sutro LLP

[57] ABSTRACT

An electric power steering device includes an output shaft connected to a steering mechanism of a steering system for power assisting the steering operation. The EPS includes a motor and a control circuit accommodated in a common motor housing. The motor housing comprises an end frame and a cup-shaped motor case hermetically covering the motor and the control circuit. The end frame is secured to a rack housing accommodating the steering mechanism, so that heat generated by the motor and the control circuit is transmitted to the rack housing.

20 Claims, 9 Drawing Sheets

5,810,111

ELECTRIC POWER STEERING DEVICE

BACKGROUND OF THE INVENTION

1. Field of the Invention

The present invention relates to an electric power steering device for assisting the steering operation.

2. Description of the Related Art

Nowadays, an electric power steering device (hereinafter as "EPS") has been put into practical use, according to which the steering operation is assisted by the rotational output of a motor. The EPS comprises a motor which assists the steering power; a torque sensor which detects the steering torque; an electromagnetic clutch which disconnects the motor from the steering mechanism under abnormal condition; and a control circuit which controls the motor current based upon signals detected by the torque sensor, a vehicle speed sensor and other sensors. The EPS is mounted to a vehicle at a lower position in the engine room and is exposed to undesirable environmental conditions such as being submerged in the water at a running speed even though the depth of water may be small and being subjected to muddy water and snow. Therefore, the control circuit of the EPS is usually arranged inside the passenger compartment where the environment is more favorable.

The conventional electric power steering devices, however, involve the following problems.

(1) The control circuit has many signal lines that are connected to the motor, the electric clutch, the rotational angle sensor to detect the steering angle and other similar units. Therefore, many connectors are used for connecting these signal lines, causing the control circuit to become bulky. Furthermore, a defective contact of the connectors may occur with an increase in the number of the connectors.

(2) In order to mount the control circuit in the passenger compartment, the signal lines must pass through a partitioning wall between the compartment and the engine room. So an increased number of assembling steps are required to accomplish the connection. In particular, the wiring for flowing a large motor current therethrough is thick from the standpoint of decreasing wiring resistance, and is not easy to handle.

(3) In the EPS, the motor current is controlled by the switching operation of transistors, so electromagnetic noise occurs due to the switching operation of the transistors.

SUMMARY OF THE INVENTION

In view of the above-mentioned problems, an object of the present invention is to provide an electric power steering device which is small in size, requiring a simplified wiring, generating less electromagnetic noise, and featuring a high reliability.

According to the present invention, there is provided an electric power steering device for an automobile having a steering system which includes a steering mechanism accommodated in a rack housing; the electric power steering device comprising an output shaft coupled to the steering mechanism, a motor assisting torque of the steering mechanism via said output shaft, a control circuit for controlling the motor, and a motor housing for accommodating the motor and the control circuit, wherein the motor and the control circuit with the motor housing is arranged in thermal contact with the rack housing.

In this arrangement, the control circuit and the motor can be accommodated in the common motor housing. It is possible to electrically connect the control circuit to the motor within the motor housing. By connecting the control circuit to the motor within the motor housing, connecting the control circuit to external units by wirings is not necessary. Thus, the number of the necessary harnesses can be decreased. Accordingly, it is possible to reduce defective signal contacts of the connectors or damages to harnesses in the whole system, thereby greatly improving reliability.

In addition, the motor and the control circuit with the motor housing are arranged in thermal contact with the rack housing. The rack housing is preferably made of aluminum and has a large thermal capacity and a small heat resistance. Hence, the rack housing suitably absorbs heat transmitted from the motor housing, so that heat generated by the motor and the control circuit is efficiently radiated through the motor housing to the rack housing. As a result, the temperature in the motor housing is maintained relatively low, and a stable operation of the electric power steering device is guaranteed.

An aspect of a preferred embodiment is that the motor housing comprises an end frame which has the motor and the control circuit assembled thereonto and a cup-shaped motor case which covers the motor and the control circuit. The motor case is hermetically coupled to the end frame, and the end frame is fixed to the rack housing. The resulting motor housing as a whole is a water-proof structure, where the connector for connection to external units can hermetically pass through the motor case without impairing waterproof characteristics.

Another aspect of the preferred embodiment is that a coating material having a small thermal resistance and a good sealing property is applied between adjoining surfaces of the end frame and the rack housing. Therefore, heat is transferred from the end frame to the rack housing while the internal space in the motor housing is in an air-tight condition.

Yet another feature of the preferred embodiment is that the end frame is integrally provided with a thin heat-radiating plate, and the control circuit is assembled so that it forms a thermal contact with the heat radiating plate. Therefore, the heat resistance between the control circuit and the end frame is decreased and it possible to suppress the rise of temperature of the control circuit.

BRIEF DESCRIPTION OF THE DRAWINGS

The present invention will become more apparent from the following description of the preferred embodiments, with reference to the accompanying drawings.

DESCRIPTION OF THE PREFERRED EMBODIMENTS

An embodiment of the electric power steering device (EPS) of the present invention will now be described with reference to the drawings.

Figure 1:
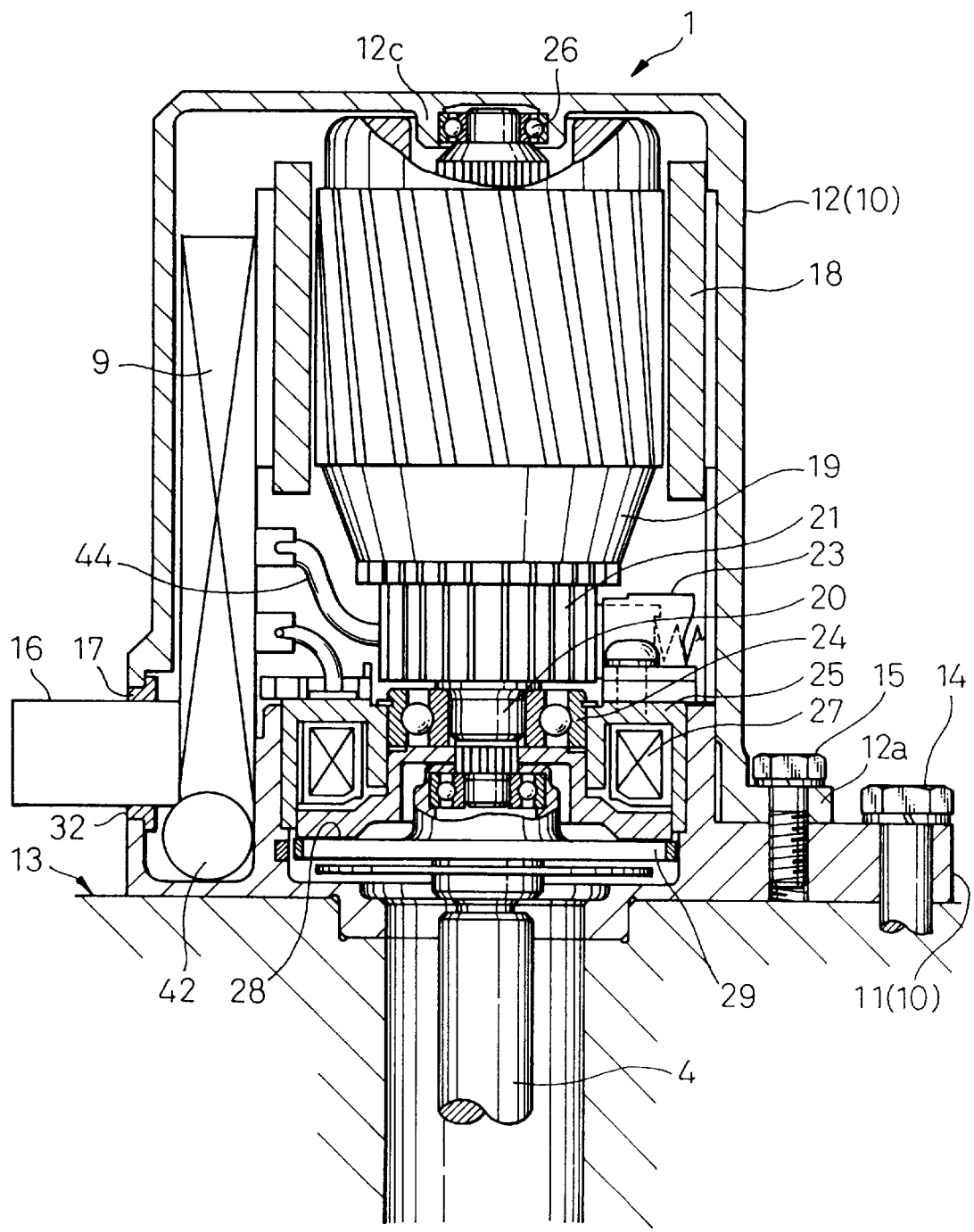
FIG. 1 is a cross-sectional view illustrating the motor housing and the rack housing of the electric power steering device according to the embodiment of the present invention.
Figure 2:
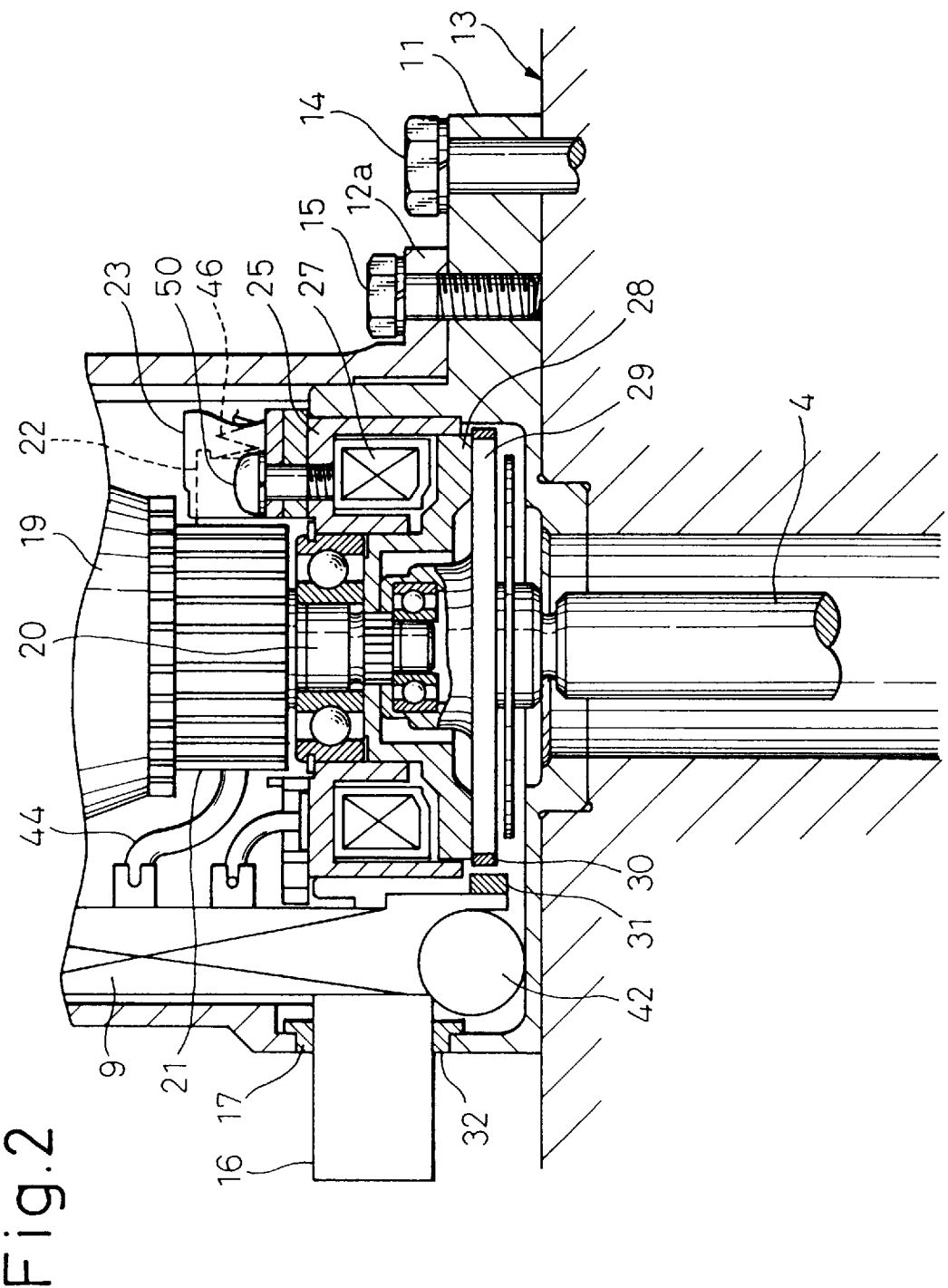
FIG. 2 is an enlarged cross-sectional view of a portion of the motor housing and the rack housing of FIG. 1.
Figure 3:
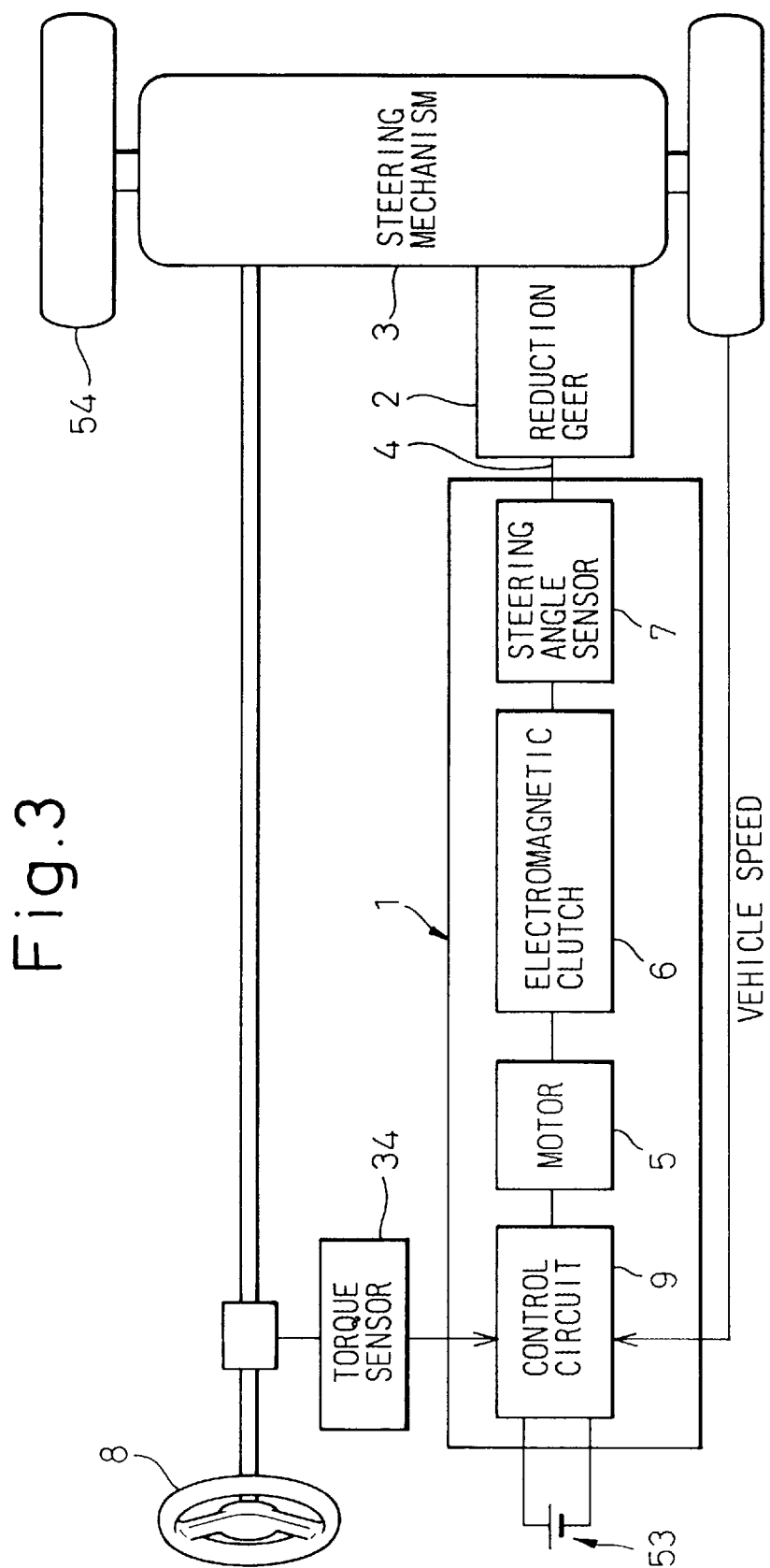
FIG. 3 is a diagram illustrating the steering system including the electric power steering device.

FIGS. 1 and 2 show the internal structure of the electric power steering device (EPS). FIG. 3 shows the steering system including the electric power steering device of FIGS. 1 and 2.

As shown in FIG. 3, the steering system of an automobile has a steering wheel 8 and a steering mechanism 3 coupled to the steering wheel 8 via a steering column which moves wheels 54 of the automobile. The EPS 1 includes an output shaft 4 coupled to the steering mechanism 3 via a reduction gear 2; a motor 5 which produces a rotational output; an electromagnetic clutch 6 which transmits the rotational output of the motor 5 to the output shaft 4; a steering angle sensor 7 which detects the steering angle (rotational angle of the output shaft 4); and a control circuit 9 which controls the motor current depending upon the steering force of a steering wheel 8 and the vehicle speed. These constituent parts (motor 5, electromagnetic clutch 6, steering angle sensor 7, control circuit 9) other than the output shaft 4 are constituted in a unitary structure and are accommodated in a motor housing 10 (see FIG. 1).

As shown in FIG. 1, the motor housing 10 comprises an end frame 11 to which the above-mentioned parts are mounted, and a motor case 12 hermetically fitted to the end frame 11 for enclosing the constituent parts. The end frame 11 is attached to the end surface of a rack housing 13 which accommodates the steering mechanism 3 and is made of a material having good heat conductivity, for example aluminum. The end frame 11 is then secured to the rack housing 13 by tightening bolts 14. The motor case 12 is made of a magnetic material (e.g., steel), shaped in a cylindrical shape with one closed end (upper end in FIG. 1) so as to form a shape of a cup and secured at its fixing portions 12a to the end frame 11 by tightening bolts 15. A passage opening 17 (FIG. 2) is formed in the open end portion of the motor case 12 and the end frame 11 to allow a connector 16 to extend therethrough to electrically connect the control circuit 9 to external units (not shown).

The motor 5 comprises a field device 18 (e.g., a cylindrical magnet shown in FIG. 1); an armature 19 that revolves along the inner periphery of the magnet 18; a commutator 21 provided on one end of a shaft 20; brushes 22 (see FIGS. 2 and 8) that are brought into sliding contact with the outer peripheral surface of the commutator 21; and a brush holder 23 for holding the brushes 22. The armature 19 is mounted in an upright position with respect to the end frame 11 in FIG. 1. As shown in FIG. 1, the armature 19 is rotatably supported by bearings 24, 25. One bearing, arranged in a housing 25 of the electromagnetic clutch 6, rotatably supports the armature 19 on one end of the shaft 20 adjacent to the commutator 21. The other bearing 26 arranged in a bearing portion 12c of the bottom surface of the motor case 12 rotatably supports the armature 19 on the other end of the shaft 20.

The electromagnetic clutch 6 is provided between the motor 5 and the output shaft 4, and it has a coil 27 controlled by the control circuit 9; the housing 25 secured to the end frame 11 for holding the coil 27; a rotor 28 coupled to one end of the shaft 20 for rotation therewith; and an armature 29 coupled to the output shaft 4 for rotation therewith.

When an electric current is supplied to the coil 27 through the control circuit 9, the armature 29 is attracted to the rotor 28 that is magnetized by the magnetic force of the coil 27. Then the armature 29 rotates together with the rotor 28, and the rotational output of the motor 5 is transmitted to the output shaft 4 through the rotor 28 and the armature 29. However, when the operation of the EPS is abnormal, no electric current is supplied to the coil 27 through the control circuit 9. So the rotational output of the motor 5 will not be transmitted to the output shaft 4. Thus, the shaft 20 is disconnected from the output shaft 4.

As shown in FIG. 2, the steering angle sensor 7 comprises a magnetic member 30 (e.g., magnet) secured to the outer peripheral surface of the armature 29 of the electromagnetic clutch 6 and a magnetism detector 31 (e.g., Hall IC) disposed on the outside of the armature 29 opposite to the magnetic member 30. A change in the magnetic flux during the rotation of the magnetic member 30 with the armature 29 is detected by the magnetism detector 31. The magnetism detector 31 is directly soldered to the substrate 9a (see FIG. 6) of the control circuit 9.

The control circuit 9 is disposed in the motor housing 10 in a side-by-side relationship with the motor 5, and the connector 16 is coupled to the control circuit 9 for connection to external units. As shown in FIGS. 1 and 2, the connector 16 hermetically extends through the passage 17 formed between the motor case 12 and the end frame 11 via a sealing member 32.

Figure 4:
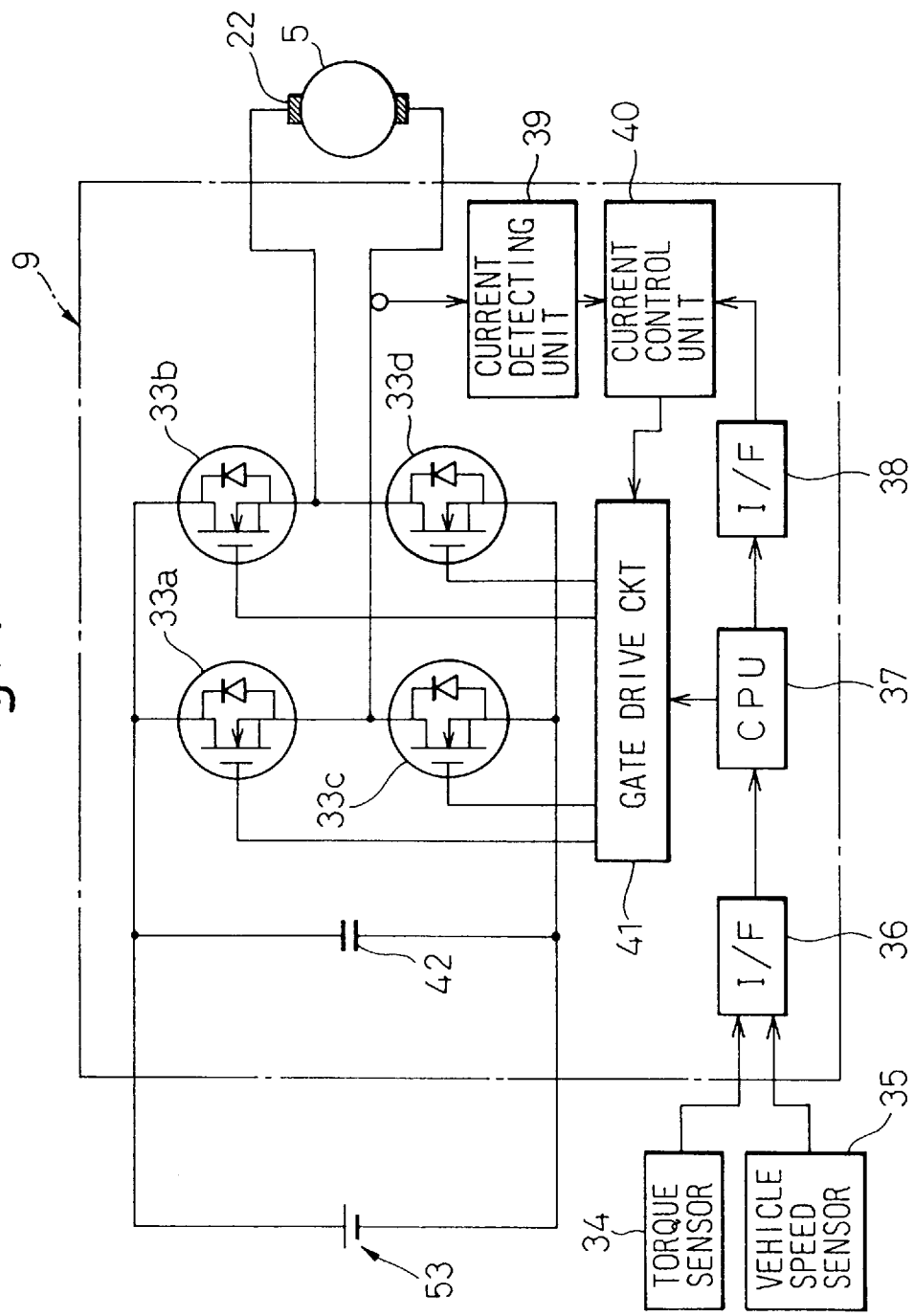
FIG. 4 is a block diagram illustrating the internal constitution of the control circuit.

In FIG. 4, the control circuit 9 comprises four switching elements 33 (33a to 33d) forming an H-bridge circuit; an I/F circuit 36 converting input signals delivered from a torque sensor 34 that detects the steering torque and a vehicle speed sensor 35 that detects the vehicle speed into digital signals; a microcomputer (CPU) 37 for setting a motor current required for assisting the torque depending upon the steering force converted by the I/F circuit 36 and the vehicle speed; an I/F circuit 38 converting a digital signal output from the microcomputer 37 into an analog value; a current detecting unit 39 which detects a current flowing into the motor 5; a current control unit 40 which forms a duty signal for the switching elements 33 based on an analog current instruction value converted by the I/F circuit 38 and a current value detected by the current detecting unit 39; a gate drive circuit 41 which drives the switching elements 33 upon receiving the duty signal formed by the current control unit 40 and a direction to assist the torque determined by the microcomputer 37; and a capacitor 42 which smoothens a battery current that undergoes fluctuation during the switching operation of the switching elements 33.

The control circuit 9 further comprises a temperature sensor (not shown) near the switching element 33 mounted to the substrate 9a to limit the current depending upon the operation temperature of the switching element 33. That is, the EPS 1 permits the flow of a large current within short periods of time, and overheating may result depending upon the conditions of use. By limiting the current in response to the operation temperature of the switching elements 33 detected by the temperature sensor, which the operation temperature is usually set to a value lower than the operation temperature of the winding of the motor, it is possible to use the motor 5 within a permissible temperature range at all times. By mounting the temperature sensor directly onto the substrate 9a, the wiring can be omitted.

Figure 5:
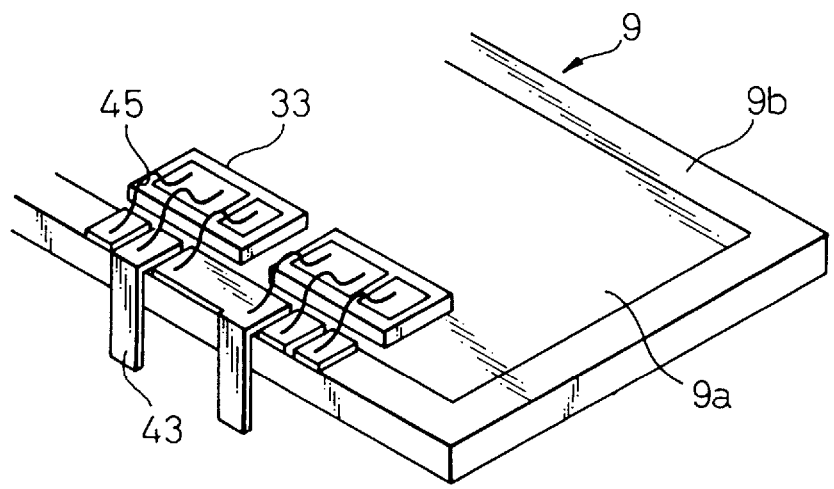
FIG. 5 is a perspective view illustrating connection terminals of the control circuit.
Figure 6:
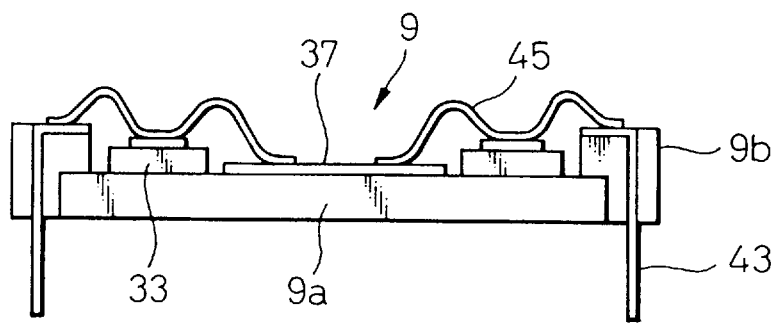
FIG. 6 is a side cross-sectional view illustrating connection terminals of the control circuit.

As shown in FIGS. 5 and 6, a motor wiring connecting the control circuit 9 (switching elements 33) to the motor 5 (brushes 22) is realized by using connection terminals 43 provided on the control circuit 9. That is, pigtails 44 (see FIGS. 2 and 8) leading from the brushes 22 are usually made of a copper mesh wire to provide a lower resistance, and on the other hand, the connection of the switching elements 33 is carried out by bonding wires 45. Thus, the brushes 22 and the switching elements 33 are coupled in a different manner. According to this embodiment, therefore, an external case 9b (made of a resin) of the control circuit 9 is provided with connection terminals 43 (by insert molding), so that bonding wires 45 leading from the switching elements 33 are connected to the connection terminals 43, and pigtails 44 of the brushes 22 are connected (by welding) to the connection terminals 43, thereby realizing the motor wiring (see FIG. 8).

The motor 5, the control circuit 9, electromagnetic clutch 6 and steering angle sensor 7 of the EPS 1 are accommodated in the motor as a unit. Therefore, the layout arrangement of the parts will become an important problem for improving the mounting density without impairing the functions of the constituent parts. Moreover, since the heat generating units, such as the motor 5 and the control circuit 9, are compactly arranged, it is important to ensure a good heat-radiating performance.

Therefore, this embodiment employs the layout structure shown in FIG. 1 to obtain a good heat-radiating performance without impairing the functions of the constituent parts.

Figure 7:
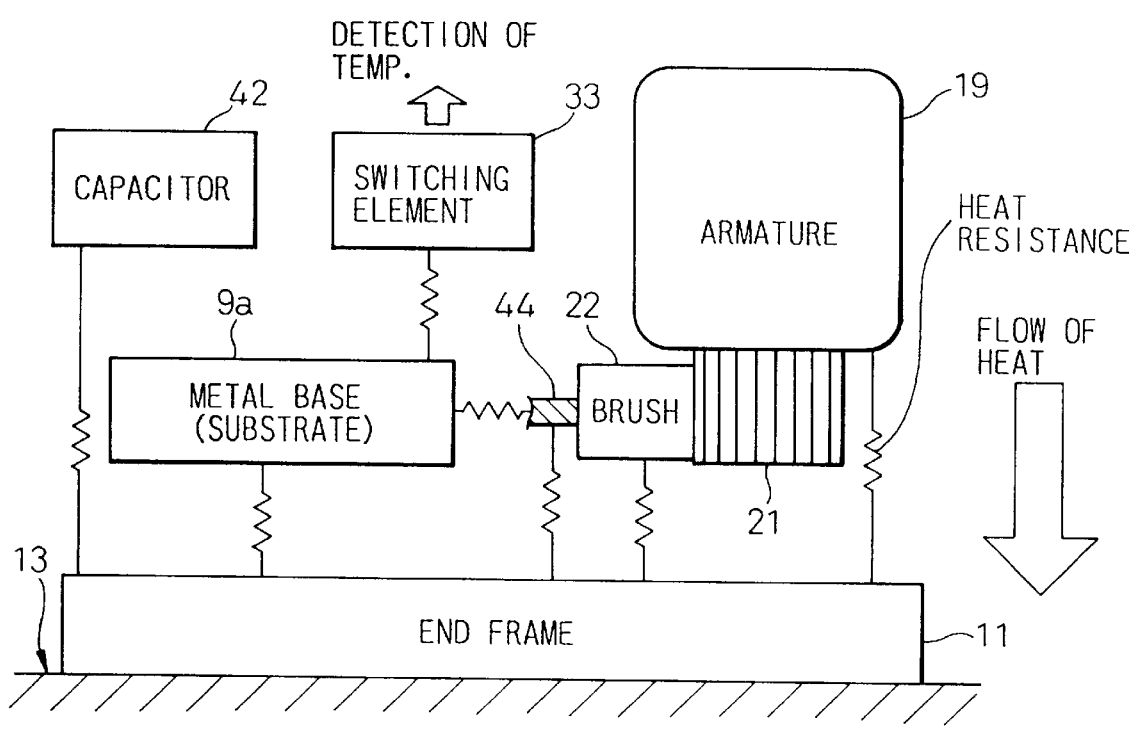
FIG. 7 is a model diagram illustrating the flow of heat.

Basically, from the standpoint of designing the heat radiation, heat generated by the motor 5 and the control circuit 9 is transmitted to the end frame 11 as shown in FIG. 7 (a model diagram illustrating the flow of heat). The heat radiates from the end frame 11 to the rack housing 13 (made of aluminum) which contains the steering mechanism 3. Therefore, it becomes necessary to contrive an arrangement which achieves an efficient transmission of heat to the end frame 11 from the armature 19 and brushes 22 of the motor 5, the switching elements 33 (heat generated accompanying the switching operation), and the capacitor 42 (loss due to reactive current) which are major sources of heat.

One such arrangement of the motor 5 is first described. The motor 5 is disposed so that the shaft 20 is concentrically arranged with the output shaft 4 extending through the end frame 11 via the electromagnetic clutch 6. Therefore, in order to efficiently transmit the heat generated from the brushes 22 to the end frame 11, it is advisable to arrange the commutator 21 near the end frame 11. That is, the brushes 22 are arranged near the end frame 11 so that the heat resistance between the brushes 22 and the end frame 11 can be decreased.

Figure 8:
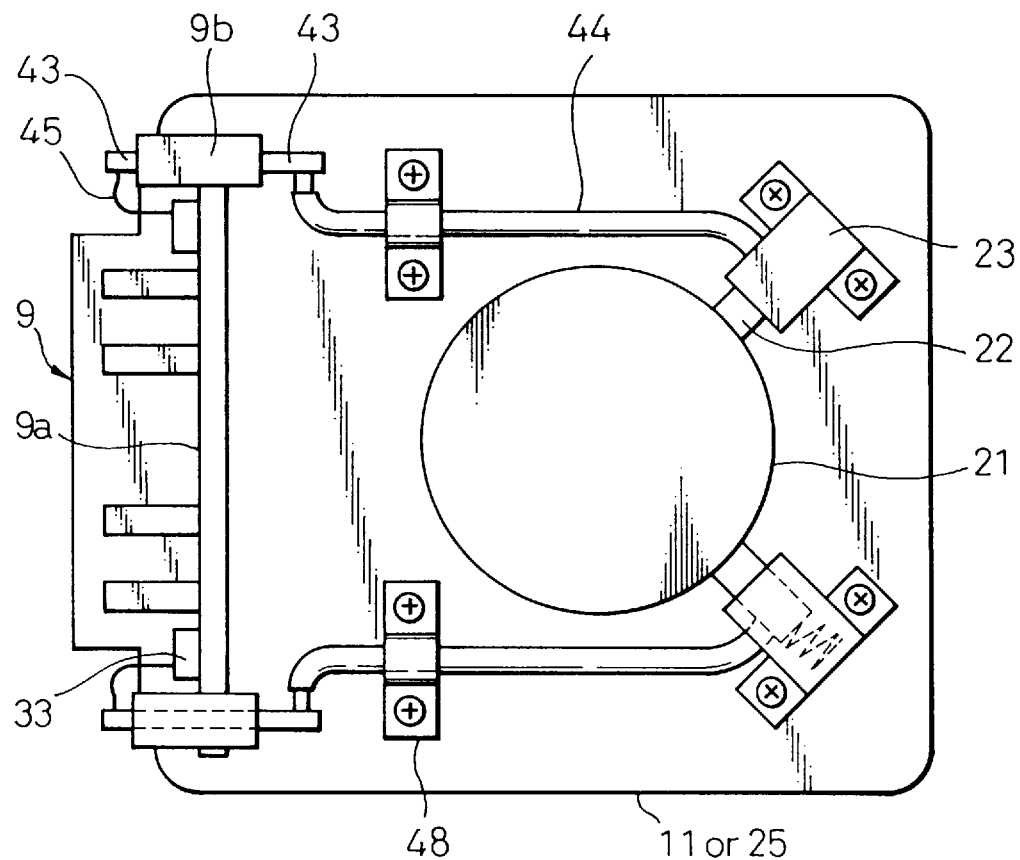
FIG. 8 is a plan view illustrating the control circuit and the brushes.

Furthermore, from the functional point of view, it is preferable that the brushes 22 are arranged on the opposite side of the control circuit 9 from the motor 5 with the commutator 21 disposed in the center (see FIG. 8). That is, the brushes 22 are maintained in a sliding contact with the outer peripheral surface of the commutator 21 by a spring 46 (see FIG. 2). Thus, a contact pressure against the commutator 21 is obtained at all times even when it is worn out. When the brushes 22 are disposed near the control circuit 9 with the commutator 21 in a center, the shortened pigtails 44 are connected to the brushes 22 and stress is exerted on the brushes 22 so as to prevent its desired motion. When the brush 22 is disposed on the opposite side of the control circuit 9 with the commutator 21 in a center, as shown in FIG. 8, elongated pigtails 44 can be connected to the brushes 22, thereby imparting freedom of motion to the brushes 22 wherein the motion of the brushes 22 is not hindered.

Figure 9:
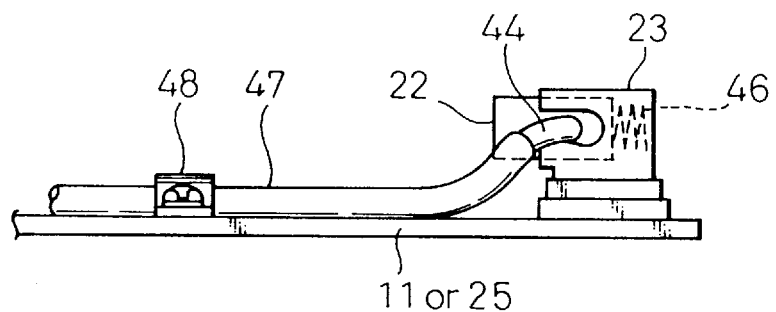
FIG. 9 is a side view illustrating the pigtails.

In order that the heat generated from the brushes 22 is efficiently transmitted to the end frame 11, the pigtails 44 may be covered with sleeves 47 made of an insulating member having a small heat resistance, as shown in FIG. 9. Further, the pigtails 44 may be clamped as designated at 48 to the end frame 11 or to a metal member that is thermally contacted to the end frame 11 (e.g., housing 25 of the electromagnetic clutch 6). Accordingly, the heat generated from the brushes 22 is transmitted to the end frame 11 or to the metal member (hereinafter referred to as housing 25 for explanatory purposes) through the pigtails 44. By treating the surface of the end frame 11 or the housing 25 with alumite or the like to impart electric insulation thereto, the pigtail 44 may be secured in its bare form to the end frame 11 or to the housing without being covered with the above-mentioned sleeve 47.

Figure 10:
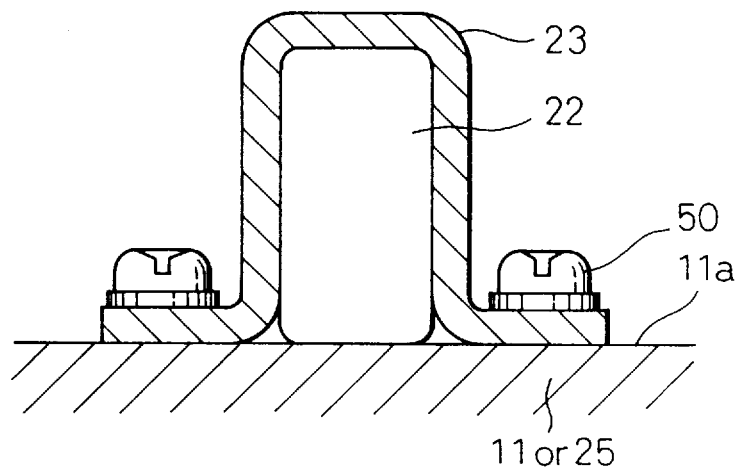
FIG. 10 is a cross-sectional view illustrating the brush holder.

Moreover, heat generated from the brushes 22 may be radiated into the end frame 11 via the brushholder 23. In particular, the brush holder 23 is made of a material having good heat conductivity, e.g., aluminum. An alumite layer 11a having a small heat resistance and insulating property is formed on the surface of the end frame 11 or the surface of the housing 25 (treatment with alumite as described above), and the brush holder 23 is secured from the upper side of the alumite layer 11a using screws 50 or the like (see FIG. 10). Accordingly, heat generated from the brushes 22 is transmitted to the end frame 11 or to the housing 25 via the brush holder 23. In FIGS. 1 and 2, the brush holder 23 is secured to the housing 25 of the electromagnetic clutch 6. Here, however, since the housing 25 is thermally contacted to the end frame 11, heat transmitted to the housing 25 is further transmitted to the end frame 11.

Figure 11:
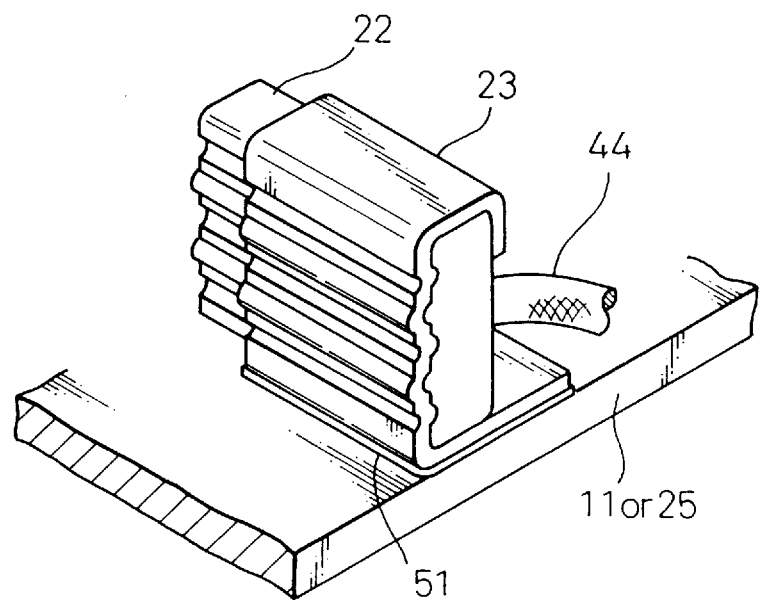
FIG. 11 is a perspective view illustrating the brush holder.
Figure 12:
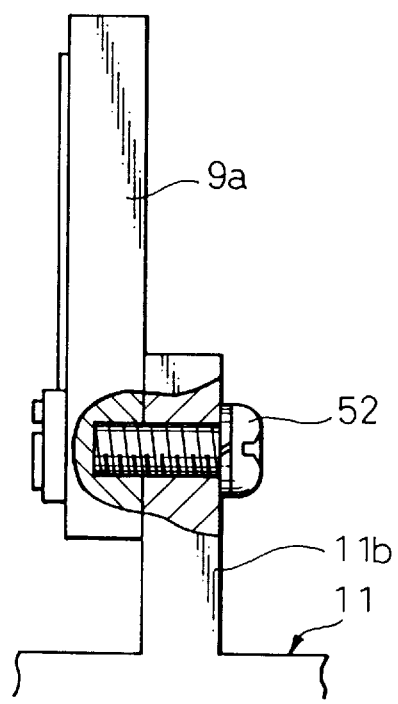
FIG. 12 is a cross-sectional view illustrating the mounting of the control circuit.

As shown in FIG. 11, the contact surfaces between the brushes 22 and the brush holder 23 may be formed ruggedly to increase the contact areas between the brushes 22 and the brush holder 23, which improves heat conductivity. In this case, an insulator (insulating member having a small heat resistance) may be interposed between the brush holder 23 and the end frame 11 or the housing 25. Alternatively, the surface of the end frame 11 or the housing 25 may be treated with alumite as described above.

Yet another alternative is forming an insulating film (coating or the like) having a negligibly small heat resistance on the inner surface of the brush holder 23, which is the surface that comes in contact with the brushes 22, to maintain insulation relative to the brushes 22 and to directly secure the brush holder 23 without effecting insulation treatment onto the surface of the end frame 11 or of the housing 25 (or without interposing an insulator).

The arrangement of the control circuit 9 is then described below. As shown in FIG. 1, the control circuit 9 is disposed by the motor 5 in parallel with the magnet 18 of the motor 5, so that the connector 16 is formed integrally with the outer case 9b of the control circuit 9 and the connector 16 is passed through the passage 17. As a result of this arrangement, the switching elements 33 and the capacitor 42 are disposed near the end frame 11, enabling the heat generated due to the switching operation of the switching elements 33 and the heat generated from the capacitor 42 to be efficiently transmitted to the end frame 11.

In order to decrease the heat resistance relative to the end frame 11, the substrate 9a (metal base) in the control circuit 9 may be secured by using a screw 52 to a heat-radiating plate 11b provided on the end frame 11.

The operation of the EPS 1 according to this embodiment is as follows. When the steering wheel 8 is operated by a driver, the steering force is detected by the torque sensor 34 and is input to the control circuit 9. The control circuit 9 calculates the assisting torque based on an input signal from the torque sensor 34 and a vehicle speed signal input from the vehicle speed sensor 35. Then the control circuit 9 sets a motor current for producing the torque. A duty signal for driving the switching elements 33 is formed depending on a current instruction value for instructing the motor current and a current that flows into the motor 5. The switching elements 33 are turned on and off depending upon the duty signal and the direction for assisting the torque, and a voltage applied to the motor 5 from a battery 53 (see FIGS. 3 and 4) is varied to control the current that flows into the motor 5.

The torque produced by the motor current is transmitted to the output shaft 4 through the electromagnetic clutch 6 and is further transmitted to the reduction gear 2 that is in mesh with the output shaft 4 to assist the torque of the steering mechanism 3. As a result, the driver needs to exert a decreased steering force, and the output of the torque sensor 34 decreases, thereby completing the steering operation. Here, however, in case the computer 37 in the control circuit 9 diagnoses that the EPS 1 is abnormally operating, no current is supplied to the coil 27 of the electromagnetic clutch 6, and the motor 5 is disconnected from the steering mechanism 3. The steering operation is then manually executed by the driver without relying upon the motor 5, and safety is maintained.

When turning the vehicle, the tires 54 (see FIG. 3) produce a self-aligning torque SAT, the force that works to bring the steering wheel 8 back to its neutral position. When the turned steering wheel 8 that is released from the hands, SAT acts upon the steering wheel 8 so that the steering wheel returns back to its neutral steering angle position. When the EPS 1 is mounted, however, the frictional torque (load torque of when no assisting torque is produced) of the motor 5 is amplified by the reduction gear 2 and becomes greater than SAT. Accordingly, the steering wheel 8 does not return back to its neutral steering angle position despite being released from the hands. In such a case, the steering angle is detected by the steering angle sensor 7 and the motor current is controlled based upon the detected value, so that the steering wheel 8 that is released from the hands returns back to the neutral steering angle position.

The features and effects of this embodiment are as follows:

(1) In the EPS 1 according to this embodiment, the control circuit 9, the electromagnetic clutch 6, and the steering angle sensor 7 are accommodated in the motor housing 10 together with the motor 5 as a unitary structure in a compact form, enabling the electric connection from the control circuit 9 to the motor 5, the electromagnetic clutch 6, and the steering angle sensor 7 all accomplished inside the motor housing 10. This makes it possible to decrease the number of signal lines (i.e., number of harnesses) to the external units and to decrease the number of connectors provided for the control circuit 9 for connection to the external units. As a result, the whole system is small in size and has a reduced weight. Therefore, the probability of developing defective signal transmission caused by poor connector contact and biting of harnesses is greatly decreased, and reliability improved.

(2) In general, when the switching elements 33 operate to control the motor current, electromagnetic noise radiates in larger amounts from the harness to the motor 5 than from the power-source line of the battery 53. In this EPS 1 in which the control circuit 9 is connected to the motor 5 in the motor housing 10, electromagnetic noises generated by the switching operation of the switching elements 33 are decreased by the electromagnetic shielding effect of the motor case 12, and the electromagnetic noises do not cause a problem.

(3) Due to the structure in which the heat generated from the motor 5 and the control circuit 9 is efficiently radiated to the end frame 11, the heat is radiated less by the convection of the air inside the motor housing 10 which makes it possible to suppress the rise of temperature of the internal atmosphere, thereby guaranteeing a stable operation.

Moreover, heat transmitted to the end frame 11 is radiated to the open air via the rack housing 13 of the steering mechanism 3. The rack housing 13 is made of aluminum having good heat radiating property; has a large thickness to meet the requirement of mechanical strength; and has a large heat capacity. With the end frame 11 being intimately adhered and secured to the rack housing 13, the heat capacity of the rack housing 13 can be equally included in the heat capacity of the end frame 11. The steering mechanism 3 is mounted at a lower position of the vehicle where it is subjected to a temperature lower than in the engine room where the temperature is high. While it is considered that the steering mechanism 3 is heated by the exhaust pipe of a high temperature, heat can be easily shielded by interposing a shielding plate between the steering mechanism and the exhaust pipe. Thus, temperature rise due to the radiant heat can be suppressed.

Accordingly, heat that is generated in large amounts from the motor 5 and the control circuit 9, flows from the end frame 11 to the rack housing 13 making it possible to suppress the temperature of the end frame 11 from rising. Here, in order to adhere and secure the end frame 11 to the rack housing 13, it is desired to apply a heat-conducting grease (coating material of the invention) having small heat resistance and high sealing property onto the surface of the rack housing 13 on which the end frame 11 is secured.

The EPS 1 does not assist the torque when the vehicle is running straight but assists the torque only when the vehicle is turning, which consumes energy. However, the turn running is less frequent than the straight running; i.e., energy is little consumed and heat generally is generated in small amounts from the motor 5 and the control circuit 9. Therefore, the heat transmitted to the end frame 11 from the motor 5 and the control circuit 9, is easily radiated into the air from the rack housing 13.

When moving the vehicle out of a narrow parking area, on the other hand, steering operation, while the vehicle is at rest, may occur during a brief period of time producing a large torque assistance. Therefore, heat is generated in large amounts from the motor 5 and the control circuit 9 though only for a short period of time. Even though the heat is generated in large amounts, however, the total heat capacity inclusive of the capacity of the rack housing 13 is large, and the temperature of the end frame 11 does not rise so much.

Besides, the armature 19 of the motor 5 that most generates the heat is constituted by a core of a magnetic material and copper wires, which have a large heat capacity. Therefore, the armature 19 is not heated to a high temperature within a short period of time.

Accordingly, the temperature at each of the portions is determined depending on the average temperature of the end frame 11, i.e., depending on the average temperature of the rack housing 13.

(4) In the EPS 1 of this embodiment in which the steering angle sensor 7 is provided at a position closer to the motor 5 than the reduction gear 2, higher resolution is obtained. In other words, a higher detection precision is obtained than the actual steering angle. Therefore, even if the detection precision is lowered per a turn, the precision for detecting the steering angle is affected little; that is, a cheaply constructed sensor can be used. Moreover, the steering angle sensor 7 utilizes the armature 19 of the electromagnetic clutch 6 as a rotor, and has the magnetism detector 31 that is soldered directly onto the substrate 9a of the control circuit 9, making it possible to greatly decrease the number of constituent elements.

The above-mentioned embodiment uses a DC motor 5. However, it is also allowable to use a brushless motor which controls the rotational speed relying upon the output frequency of the inverter.

The EPS 1 of this embodiment is equipped with an electromagnetic clutch 6 as a protection means and with a steering angle sensor 7. However, the electromagnetic clutch 6 and the steering angle sensor 7 need not be provided. That is, what is important is that the control circuit 9 and the motor 5 are accommodated in the motor housing 10 as a unitary structure in a compact size.

The above-mentioned embodiment deals with a rack-mounting system in which the end frame 11 of the EPS 1 was secured onto the rack housing 13 on the outside of the passenger compartment. However, it is also allowable to employ a column-mounting system in which the EPS 1 is mounted near the column inside the passenger compartment. That is, even the column assist system which assists the torque of the steering axle via a reduction gear, has a metallic housing covering a steering mechanism, such as steering gears and having good heat conducting property. Namely, the end frame 11 of the EPS 1 is secured onto the metallic housing, and the heat is radiated from the end frame 11 to the metallic housing.

We claim:

1. An electric power steering device for an automobile having a steering system including a steering mechanism accommodated in a rack housing, the electric power steering device comprising:

an output shaft coupled to the steering mechanism;

a motor which assists in applying torque to the steering mechanism via said output shaft;

a control circuit which controls the motor; and a motor housing which accommodates the motor and the control circuit, the motor and the control circuit with the motor housing being arranged in thermal contact with the rack housing;

wherein said motor housing comprises an end frame having the motor and the control circuit assembled thereonto, and a cup-shaped motor case covering the motor and the control circuit and hermetically coupled to the end frame, the end frame being fixed to the rack housing.

2. An electric power steering device according to claim 1, wherein a coating material having a small thermal resistance and a good sealing property is applied between adjoining surfaces of the end frame and the rack housing.

3. An electric power steering device according to claim 1, wherein the end frame is integrally provided with a thin heat-radiating plate, and the control circuit is assembled so that it thermally contacts the heat-radiating plate.

4. An electric power steering device according to claim 1, wherein a connector hermetically extends through the motor housing.

5. An electric power steering device according to claim 1, wherein the motor has a rotatable shaft and a commutator on one end of the shaft which supplies a current via a brush.

6. An electric power steering device according to claim 5, wherein the brush is arranged on the opposite side of the control circuit from the commutator.

7. An electric power steering device according to claim 5, wherein said control circuit has connection terminals attached to an insulation member integrally formed with said control circuit, the connection terminals being connected to switching elements which control the motor current via bonding wires and to a pigtail of said brush.

8. An electric power steering device according to claim 5, wherein a brush holder for holding said brush is made of a material having good heat conductivity, and is secured to said end frame or to a metal member brought into thermal contact with said end frame via an insulating member having a small heat resistance.

9. An electric power steering device for an automobile having a steering system including a steering mechanism accommodated in a rack housing, the electric power steering device comprising:

an output shaft coupled to the steering mechanism;

a motor which assists in applying torque to the steering mechanism via said output shaft;

a control circuit which controls the motor; and a motor housing which accommodates the motor, the control circuit being attached to the motor housing in a side-by-side relationship with the motor, the motor and the control circuit with the motor housing being arranged in thermal contact with the rack housing.

10. An electric power steering device, according to claim 9, wherein the motor has an armature and a commutator, the control circuit being arranged outside the armature and the commutator in a side-by-side relationship with the motor.

11. An electric power steering device, according to claim 9, wherein the motor has a field device, the control circuit being arranged between the field device and the motor housing.

12. An electric power steering device, according to claim 11, wherein the motor has an armature and, a commutator, a brush slidably engaged with the commutator, and a lead wire connected to the control circuit at a position near the commutator to connect to an external device.

13. An electric power steering device according to claim 9, wherein said motor housing comprises an end frame having the motor and the control circuit assembled thereonto, and a cup-shaped motor case covering the motor and the control circuit and hermetically coupled to the end frame, the end frame being fixed to the rack housing.

14. An electric power steering device according to claim 13, wherein a coating material having a small thermal resistance and a good sealing property is applied between adjoining surfaces of the end frame and the rack housing.

15. An electric power steering device according to claim 13, wherein the end frame is integrally provided with a thin heat-radiating plate, and the control circuit is assembled so that it thermally contacts the heat-radiating plate.

16. An electric power steering device according to claim 13, wherein a connector hermetically extends through the motor housing.

17. An electric power steering device according to claim 13, wherein the motor has a rotatable shaft and a commutator on one end of the shaft which supplies a current via a brush.

18. An electric power steering device according to claim 17, wherein the brush is arranged on an opposite side of the control circuit from the commutator.

19. An electric power steering device according to claim 17, wherein said control circuit has connection terminals attached to an insulation member integrally formed with said control circuit, the connection terminals being connected to switching elements which control the motor current via bonding wires and to a pigtail of said brush.

20. An electric power steering device according to claim 17, wherein a brush holder for holding said brush is made of a material having good heat conductivity, and is secured to said end frame or to a metal member brought into thermal contact with said end frame via an insulating member having a smaller heat resistance.

* * * * *